United States Patent [19]

Vogelgesang

[11] Patent Number: 5,149,951
[45] Date of Patent: Sep. 22, 1992

[54] APPARATUS AND METHOD FOR PRESENTING A DATA CARD FOR DATA TRANSFER WITH CENTRIFUGAL FLYWEIGHT

[75] Inventor: Peter J. Vogelgesang, St. Paul, Minn.

[73] Assignee: Minnesota Mining & Manufacturing Company, a Corporation of Delaware, St. Paul, Minn.

[21] Appl. No.: 488,091

[22] Filed: Mar. 5, 1990

[51] Int. Cl.⁵ .................. G06K 7/10; G06K 7/14; G06K 7/00; G06K 13/063
[52] U.S. Cl. .................. 235/485; 235/454; 235/486; 369/270
[58] Field of Search ............ 369/180, 112, 111, 270, 369/271, 258; 235/454, 475, 480, 483, 485, 479, 486; 360/99.12

[56] References Cited

U.S. PATENT DOCUMENTS

| | | |
|---|---|---|
| 3,666,262 | 5/1972 | Fowler et al. . |
| 3,946,438 | 3/1976 | Altmann et al. . |
| 4,209,804 | 6/1980 | Dil . |
| 4,467,209 | 8/1984 | Maurer et al. . |
| 4,544,835 | 10/1985 | Drexler . |
| 4,562,570 | 12/1985 | Denton ........................ 369/270 |
| 4,592,042 | 5/1986 | Lemelson et al. . |
| 4,730,298 | 3/1988 | Takahashi ..................... 369/239 |
| 4,812,633 | 3/1989 | Vogelgesang et al. . |
| 4,831,244 | 5/1989 | Slafer et al. . |
| 4,868,373 | 9/1989 | Opheij et al. ................. 235/454 |
| 4,916,687 | 4/1990 | Endo .............................. 369/111 |

Primary Examiner—Stuart S. Levy
Assistant Examiner—Christopher R. Glembocki
Attorney, Agent, or Firm—Kinney & Lange

[57] ABSTRACT

The present invention is an apparatus and method for aligning a card with an optically readable annular data region thereon. The card is moved along a generally linear track and pushed onto a rotatable card holder which is secured in a first position for receiving the card. The data card is aligned on the card holder so that the annular data region thereon is in a desired registry with a focused laser beam. The card holder and card thereon are then rotated about a central axis of the annular data region and the laser beam is moved across the annular data region of the rotating card for data transfer. Once the desired data transfer is accomplished, the card holder rotation is stopped, the card holder is realigned in its first position and the card removed from the card holder. During rotation of card holder, a plurality of flyweights flatten the data card as a function of the rate of rotation of the card holder.

28 Claims, 7 Drawing Sheets

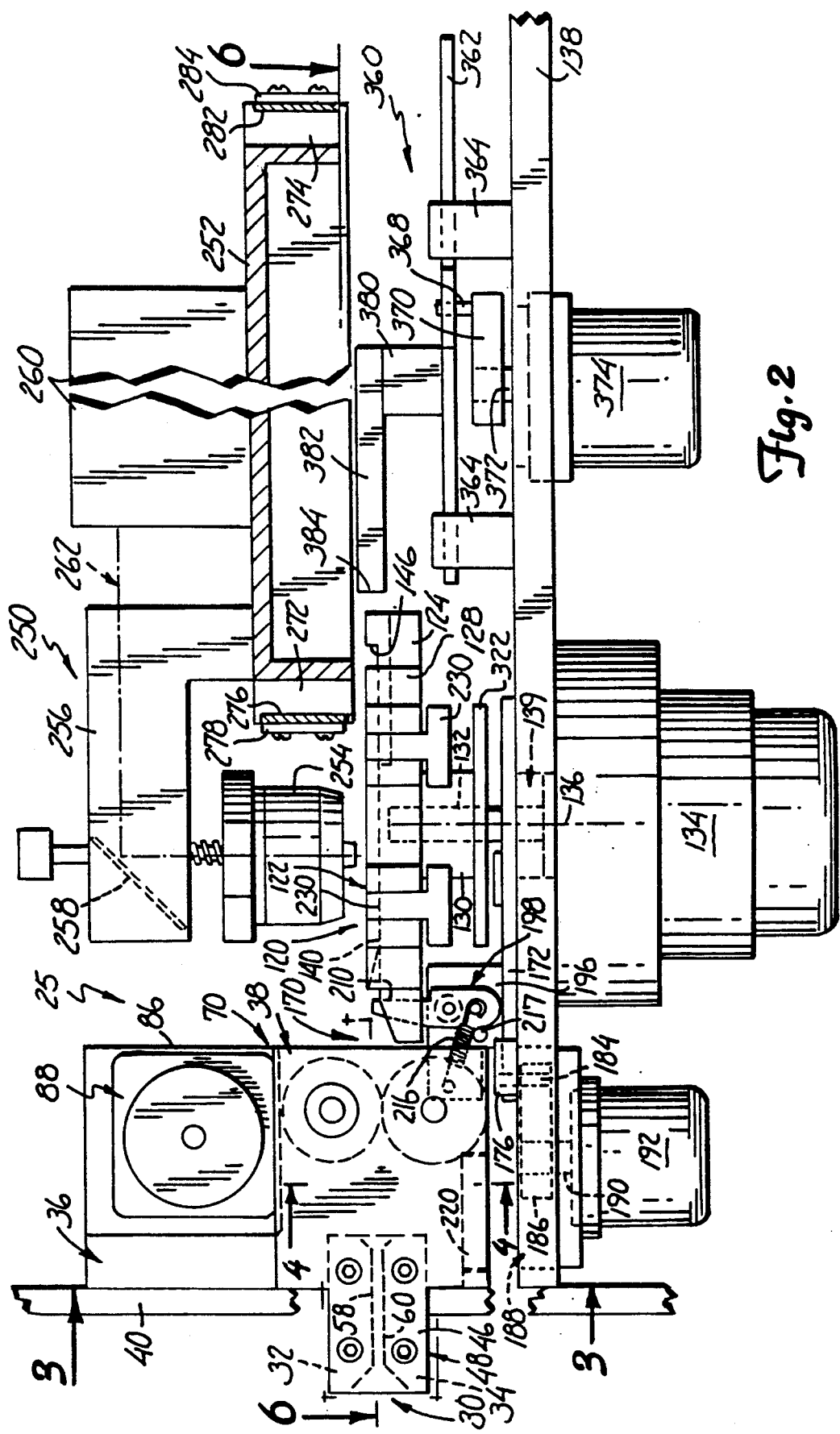

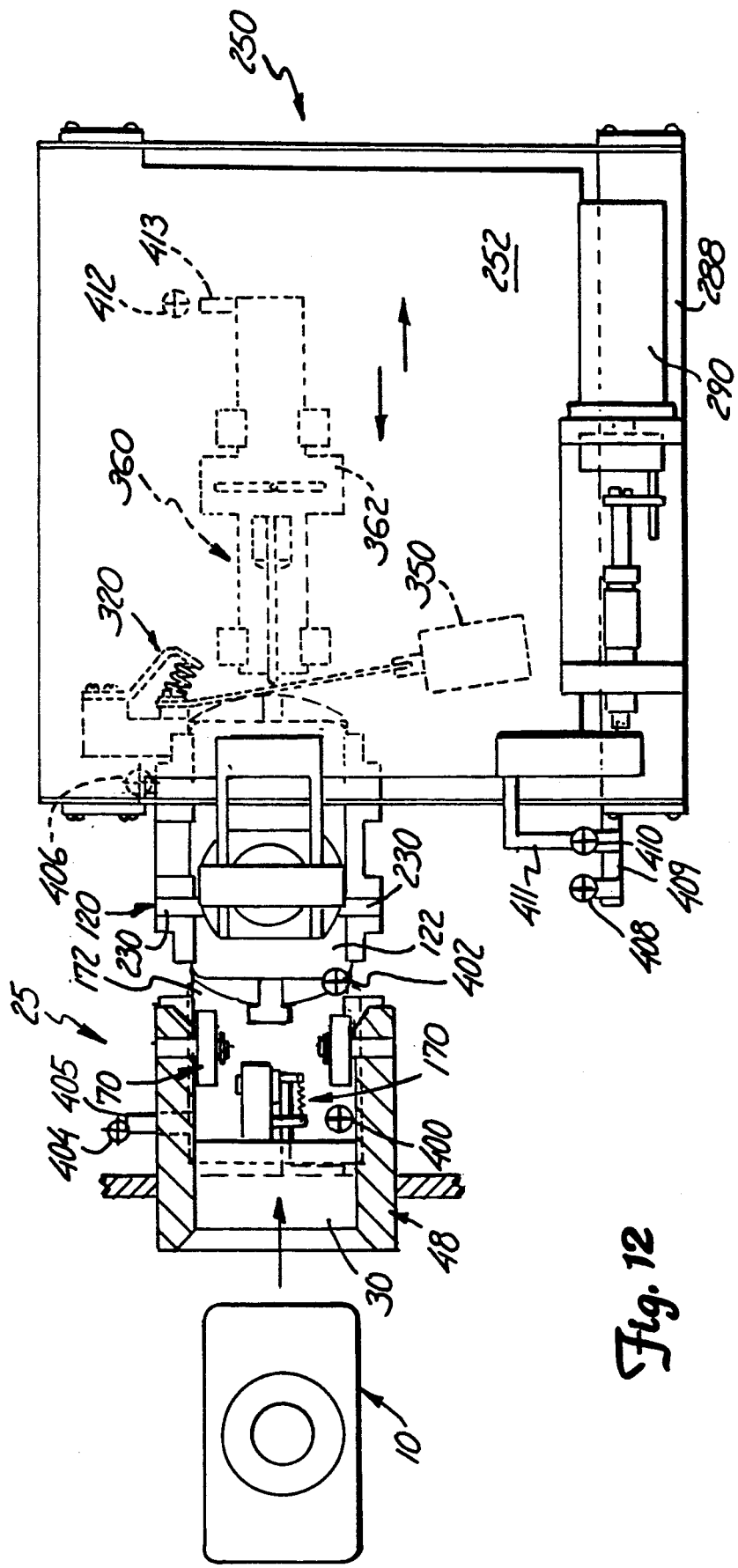

APPARATUS AND METHOD FOR PRESENTING A DATA CARD FOR DATA TRANSFER WITH CENTRIFUGAL FLYWEIGHT

BACKGROUND OF THE INVENTION

This invention relates to an apparatus and method for aligning a data card for transfer of data to and from the card. More specifically, the data card has an annular data storage region on one side and data is transferred to and from the annular data storage region by rotating the card relative to a non-rotating data transfer assembly.

Wallet-sized cards are in widespread and general use as credit cards, identification cards, passes, membership cards, driver's licenses and the like. Such cards are typically made of a solid plastic or a plastic laminate and carry visible indicia, plus embossed or raised characters which carry the person's identification, the card's identification and/or other information. Such cards are used for imprinting sales receipts, and most of such cards carry magnetic strips which contain limited amounts of digitally-encoded data. Information is transferred to and from the magnetic strips of these cards by a linear card-reading arrangement. For example, a card is inserted linearly into a card reader (such as an automatic teller machine), or one edge of a card bearing a magnetic strip is passed linearly across a reader (such as a credit card reader).

The use of higher data density optical recording techniques has been extensively explored in recent years. In optical data transfer systems, a focused laser beam is used to illuminate and detect the data encoded on the media. In a magneto-optic format, it is possible to read, erase and write data on the media with a focused laser beam in combination with a magnetic bias field adjacent the illuminated media. One form of optical recording is a disk format and is exemplified by the now-familiar "compact disk" or "CD" format for audio recordings. Optical data storage arrangements have been suggested for wallet-sized cards, with the information aligned in a linear or strip storage format, as discussed in Maurer et al. U.S. Pat. No. 4,467,209 and Drexler U.S. Pat. No. 4,544,835.

It has also been suggested that data be recorded on a card in a non-linear fashion. Lemelson et al U.S. Pat. No. 4,592,042 discloses a card reader for use in transferring data to and from a card which has data encoded thereon in an arced format. Vogelgesang et al. U.S. Pat. No. 4,812,633 and Slafer et al. U.S. Pat. No. 4,831,244 disclose cards which include a data region having data tracks aligned concentrically or in a spiral format so that the information can be read or placed on the data region of the card while the card is rotated.

The use of a card having an annular data storage region presents unique problems in terms of data transfer. In order to effectuate high rate data transfer, the card must be rapidly spun relative to a non-rotating data transfer assembly which then follows the either concentric or spiral tracks of data on the card. In order to effectively transfer data to and from such a card, an effective arrangement for card handling and presentation to the data transfer assembly is required. In handling such cards it is critical that the sensitive area on the card for data storage be protected from rough handling. For of an optical data card, the area must also be optically visible. Furthermore, because of the close spacing of the data tracks on such cards, extremely high accuracy in card alignment relative to the data transfer assembly is required. In addition, such high accuracy is required in all three axes (x-y-z) of the card during data transfer. It is further desirable to rotate the card very rapidly in order to achieve a high rate of data transfer. Finally, a system is needed that is easy to use (such as an automatic teller machine) for a person presenting a card for data transfer.

SUMMARY OF THE INVENTION

The present invention provides an apparatus and method to accommodate the concerns involved in rapid data transfer between a card having data encoded thereon in an annular region and a data transfer assembly. In order to obtain a higher recording density and a high data transfer rate, it is necessary to attain a high linear velocity and uninterrupted tracking of a data track. Hence, rotation of the data card as opposed to such movement of the data transfer assembly is desirable.

The present invention provides an apparatus for aligning a data card having a generally planar annular data storage region thereon in position for data transfer. A rotatable card holder has a support for the card that aligns the annular data storage region of the card perpendicular to the axis of rotation of the card holder. The support also aligns the card so that the axis of rotation of the card holder is coaxially aligned with the annular data storage region of the card. A drive assembly rotates the card holder and card thereon about the axis of rotation. A plurality of flyweights are pivotally mounted with respect to the card holder to apply a force, as a function of the rate of rotation of the card holder, to urge the card against the support of the card holder.

The card has a first planar side facing away from the card holder, and each flyweight has a tab portion overlying the first planar side of the card and a greater mass portion spaced therefrom. Further, each flyweight is pivotally mounted to the card holder at an area between the tab and greater mass portions thereof so that rotation of the card holder causes the greater mass portion to swing outwardly from the card holder to thereby swing the tab portion downwardly against the first planar side of the card. In this manner, the card is held firmly against the support during rotation and is also held from side-to-side or end-to-end movement relative to the support, thereby maintaining the card in its position on the support against movement in either its x, y or z axes.

For introduction and withdrawal of the data card to and from the support of the card holder, means are provided for placing the card holder in a predetermined non-rotational position. The apparatus includes a card insertion device for urging the data card onto the support of the card holder, and a card ejection device for urging the data card off of the support of the card holder.

As mentioned above, the present invention is also directed to a method of positioning a data card for data transfer. Such a data card has a generally planar annular data storage region thereon, and the first step in this method includes placing the card on a support. The support and card thereon is then rotated about an axis which is coaxial with a central axis of the annular data storage region and which is normal to the annular data storage region of the card. A force is applied, as a function of the rate of rotation of the card, to urge the card against the support.

In a preferred embodiment of this inventive method, the step of placing the card on the support includes the steps of fixing the support in a non-rotating position and inserting the card longitudinally on a linear path onto the fixed support. That path is, in part, defined by a nip between opposed rollers and the insertion of the card further includes the steps of aligning a leading edge of the card between that nip and rotating the rollers to engage the card therebetween and move it along the path toward the support. After a trailing edge of the card clears the nip, that trailing edge is engaged by a finger which is then moved toward the support. Once the card has been inserted into the support, the support is released from its non-rotatable position.

The apparatus and method for presenting a data card for data transfer of the present invention provide an accurate and efficient arrangement for aligning the annular data storage region of such a card relative to a data transfer assembly. The data storage region is fixed against side-to-side and end-to-end movement on the card support and the application of a force as a function of the rate of rotation flattens and holds the card against the support and further fixes the planar position of the card and its data storage region relative to a non-rotating data transfer assembly. Such highly accurate initial placement and position maintenance of the card is essential for accurate data transfer. The apparatus and method of the present invention also provide for careful handling of the data card and the sensitive data storage region thereon. The use of flyweights on a rotating support to immobilize the data card from movement relative to the support is highly effective in achieving this end, and elegantly simple in application.

BRIEF DESCRIPTION OF THE DRAWINGS

FIG. 2 is a side elevational view of a data transfer system embodying the present invention, with some parts removed, broken away or shown in section for clarity.

FIG. 12 is a diagrammatic representation of the data transfer system of the present invention, showing the sensors for controlling operation of this system components.

While the above-identified drawing figures set forth one preferred embodiment, other embodiments of the present invention are also contemplated, as noted in the discussion. In all cases, this disclosure presents illustrated embodiments of the present invention by way of representation and not limitation. It should be understood that numerous other modifications and embodiments can be devised by those skilled in the art which will fall within the scope and spirit of the principles of this invention. In addition, the use of such relational terms as left/right, upper/lower, horizontal/vertical, etc. are used herein for reference purposes only and are not intended to be limiting features of the invention disclosed.

DETAILED DESCRIPTION OF THE PREFERRED EMBODIMENTS

Data Card

Figure 1:
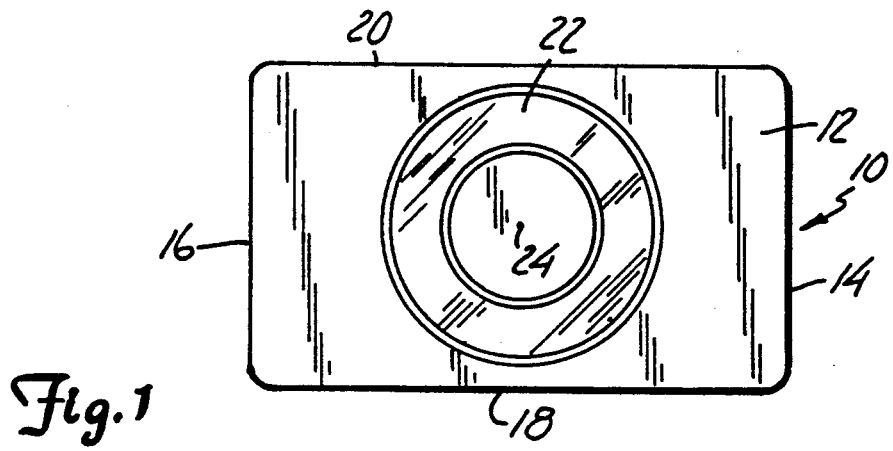
FIG. 1 is a plan view of a data card having an annular data storage region on one side thereof.

The present invention is an apparatus and method used for transferring data to and from a card having an annular data storage region thereon. Such a card is shown in FIG. 1 as data card 10. Card 10 is preferably wallet-sized, and has a first planar side 12, a second planar side (not shown) opposite the first planar side, first and second lateral end edges 14 and 16 and first and second longitudinal side edges 18 and 20. As is typical, the side edges are longer than the end edges to form a rectangularly-shaped card 10.

The data card 10 bears a generally planar annular data storage region 22 thereon, which is accessible from at least one side of the card and aligned about an axis 24 normal to the planar sides of the card. In this data storage region 22, data is stored digitally, either in an optical or magnetic media format. In an optical format, the card is preferably configured like the optical data cards set forth in Vogelgesang et al. U.S. Pat. No. 4,812,633 or Slafer et al. U.S. Pat. No. 4,831,244, both of which are incorporated by reference herein. Thus, at least one side of the card (i.e., the first planar side 12) must be sufficiently transmissive to a focused laser beam from an optical data transfer assembly to allow such light to pass through and affect an underlying optically active layer of the card in the intended way for data transfer purposes. Preferably, the media is configured for an magneto-optic system and has the capacity of storing over 20 megabytes of digital information, with a suitable magneto-optic data transfer assembly, the data storage region 22 of the card 10 would thus be readable, erasable and writable.

It is also contemplated that the data storage region 22 can serve to maintain magnetically recorded information. In that case, the first planar side 12 of the data card would bear the magnetic media which would in turn have grooves therein (concentric or spirally aligned about the axis 24). The data transfer assembly would then include a magnetic contact head designed to engage the grooves and transfer data to and from the tracks of the magnetic annular data storage region 22.

Data Transfer System Overview

In general terms, data is transferred to and from the data card 10 as follows. The card is aligned and fixed in position on a rotatable turntable. The turntable is then rotated very rapidly to rotate the card about the axis of the annular data storage region. A data transfer head (e.g., a focused laser beam or magnetic head) then moves generally linearly relative to the rotating card to scan across the tracks of the annular data storage region. After the data transfer task has been completed by such scanning, the rotation of the turntable is stopped and the card removed therefrom.

As can be appreciated, careful handling and precise alignment of the card are extremely critical to effective data transfer. Preferably, the operations described are automated or controlled by a microprocessor controller. In perhaps its simplest configuration, a data transfer system as described would be actuated by inserting a data card in a slot (like loading a bank card into an automatic teller machine) and the alignment, card rotation and scanning functions then occur automatically and/or in response to additional commands provided by an operator. Once the data transfer process is completed, the data card is ejected through the same slot for retrieval by the operator. The potential applications for such a data transfer system are numerous—it has utility wherever small, lightweight, personalized, mailable, transportable recording media is required in combination with a high density data storage capacity.

Insertion Slot and Guide Rollers

Figure 3:
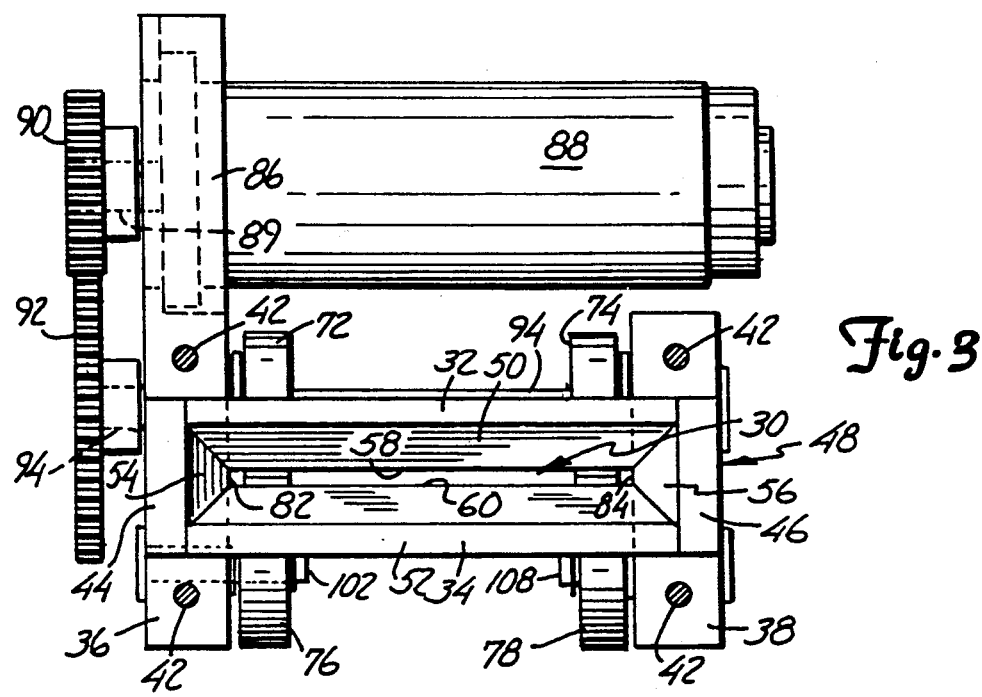
FIG. 3 is a sectional view as taken along lines 3—3 in FIG. 2.

A data transfer system 25 of the present invention is illustrated generally in FIG. 2. The data card 10 follows a predetermined, generally planar card path through the system 25, which in its first instance is defined by a card insertion slot 30. The slot 30 has a lateral extent defined by top and bottom card guides 32 and 34. As seen in FIG. 3, the top and bottom card guides 32 and 34 are supported on left and right card guides 36 and 38, respectively. The left and right card guides 36 and 38 are in turn supported off of an end wall 40 by suitable fasteners, such as fasteners 42 (the end wall 40 forms a portion of a housing and support chassis for the system 25, most of which is removed in the FIGS. for clarity). The left and right card guides 36 and 38 have card insertion projections 44 and 46, respectively, upon which the top and bottom card guides 32 and 34 are (for the most part) secured.

The assembly of top and bottom card guides 32 and 34 and projections 44 and 46 defines a slot assembly 48 for insertion slot 30, as seen in FIG. 3. Each of the components 32, 34, 44 and 46 of the slot assembly 48 has a beveled face 50, 52, 54 and 56, respectively, to facilitate insertion of the data card 10 into the slot 30. The end wall 40 has an opening configured to receive the slot assembly 48 whereby the beveled insertion areas for the slot 30 are accessible by an operator for card insertion from outside of the system housing.

As seen in FIG. 2, the top and bottom card guides 32 and 34 have opposed, parallel and generally planar card guide surfaces 58 and 60 which serve to define a first portion of the path of the data card 10 through the data transfer system 25. The planar surfaces 58 and 60 align the card generally horizontally as it is pushed into slot 30 by an operator (pushed to the right as viewed in FIG. 2). The card 10 is inserted with its first planar side "up" (as viewed in FIG. 2) for preferred access to the annular data storage region 22 thereon from the top of the card.

Figure 4:
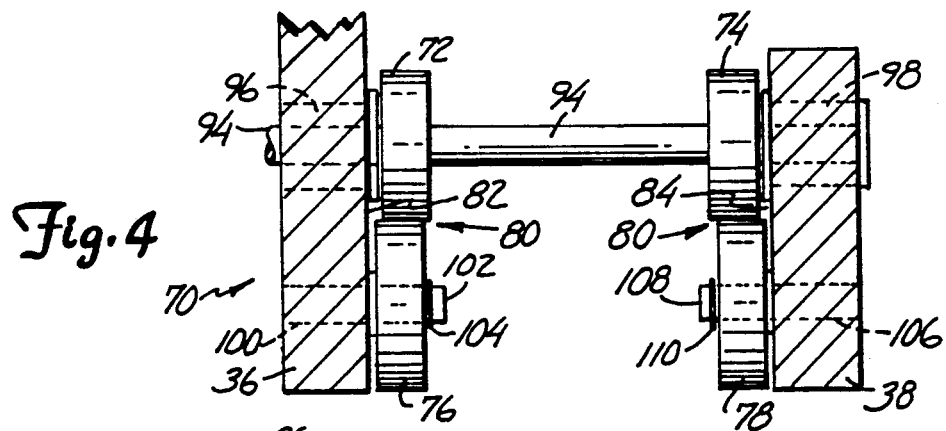
FIG. 4 is an end elevational view of the opposed rollers whose nip, in part, defines a path for the data card, as taken in section along lines 4—4 in FIG. 2.
Figure 5:
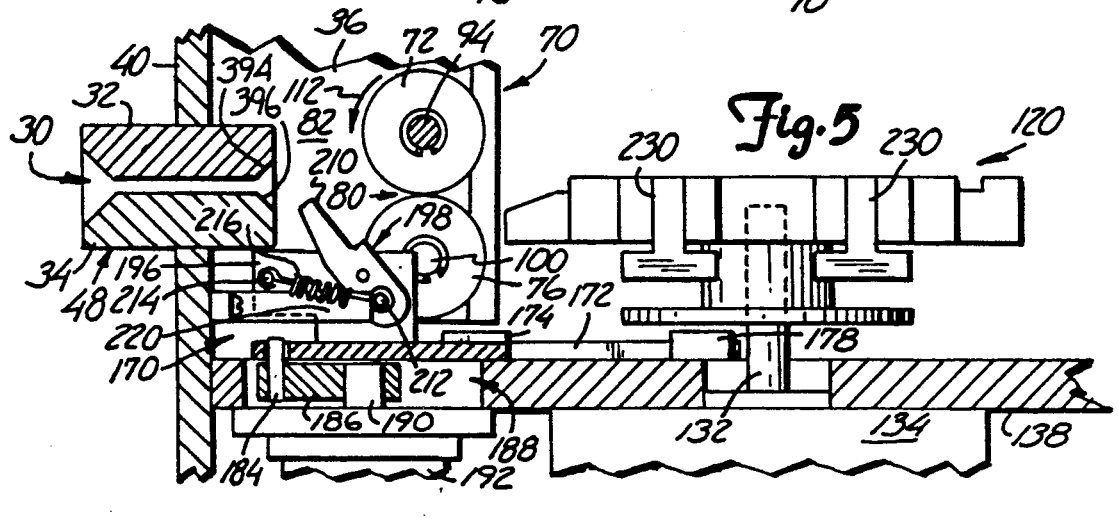
FIG. 5 a side elevational view illustrating the card insertion device in its inactive position, with its finger retracted out of the card path and some parts shown in section.

A roller assembly 70 is downstream from the slot assembly 48 on the card path. The roller assembly 70 has upper edge rollers 72 and 74 and lower edge rollers 76 and 78, as seen in FIGS. 4 and 5. The roller assembly 70 is, like the slot assembly 48, supported by the left and right card guides 36 and 38. As seen in FIG. 4, the upper and lower rollers are aligned in opposed pairs 72, 76 and 74, 78. A nip 80 defined between each pair of rollers serves to further define the data card path through the system 25, and is aligned generally coplanar with the card insertion slot 30. Inner side walls 82 and 84 of the left and right card guides 36, 38, respectively, also serve to align the data card 10 in the card path, by guiding its side edges 18 and 20. The card is thus generally aligned longitudinally along the card path so that a leading edge thereof (for example, edge 14) enters the nip 80 defined between each of the two roller pairs. The nip 80 is slightly smaller than the thickness of the card 10.

As seen in FIGS. 2 and 3, left card guide 36 has an upper portion 86 which supports a reversible roller drive motor 88. The motor 88 drives a shaft 89 upon which a first drive gear 90 is mounted, which is in engagement with a second follower gear 92 therebelow. The follower gear 92 is fixedly mounted on a shaft 94 which extends through the left and right card guides 36 and 38 and is supported by bearings 96 and 98 therein, respectively. The upper rollers 72 and 74 are fixedly mounted on the shaft 94 between the left and right card guides 36 and 38, as best seen in FIG. 4. The upper rollers 72 and 74 are preferably formed from a deformable material such as rubber, and they are fixed on the shaft 94 adjacent the inner side walls 82 and 84 of the left and right card guides 36 and 38, respectively, to be in position to engage those areas adjacent the side edges of the data card 10.

The lower rollers 76 and 78 are aligned on a common axis parallel to the axis of the shaft 94, below their respective upper rollers 72 and 74. A shaft 100 is secured to the left card guide 36 and aligned parallel to the shaft 94. The shaft 100 extends from the left card guide 36 toward the right card guide 38 to define a hub 102 for a freely rotatable mounting of the lower roller 76 thereon. A suitable retainer 104 is fixed on the hub 102 to retain the roller 76 thereon. Similarly, a shaft 106 is secured to the right card guide 38 to extend parallel to the shaft 94 and coaxially with respect to shaft 100. The shaft 106 has a hub portion 108 extending from the right card guide 38 toward the left card guide 36, and the lower roller 78 being freely rotatably mounted on the hub 108 and retained thereon by a suitable retainer 110. The lower rollers 76 and 78 are preferably made of a harder material than the upper rollers 72 and 74. Like the upper rollers 72 and 74, the lower rollers 76 and 78 are mounted adjacent the inner side walls 82 and 84 of the left and right card guides 36 and 38, respectively, so that the rollers only engage those areas adjacent the side edges 18 and 20 of the data card 10 as the data card passes through the roller assembly 70.

The data card follows a generally linear path through the slot assembly 48 and roller assembly 70, with no bending applied across the plane of the card, either laterally or longitudinally. The rollers only engage the side edge areas of the card and there is no contact made on the first planar side 12 of the card over the annular data storage region 22 thereof.

The motor 88 drives the two upper rollers 72 and 74 in a counterclockwise direction (as illustrated by arrow 112 in FIG. 5) for data card insertion into the system 25. Thus, when the leading edge 14 of the data card 10 enters the nip 80 between roller pairs 72, 76 and 74, 78, the side edge areas of the card are engaged and the card is drawn through the roller assembly 70, to the right as viewed in FIGS. 2 and 5.

Card Spinner Assembly

Figure 6:
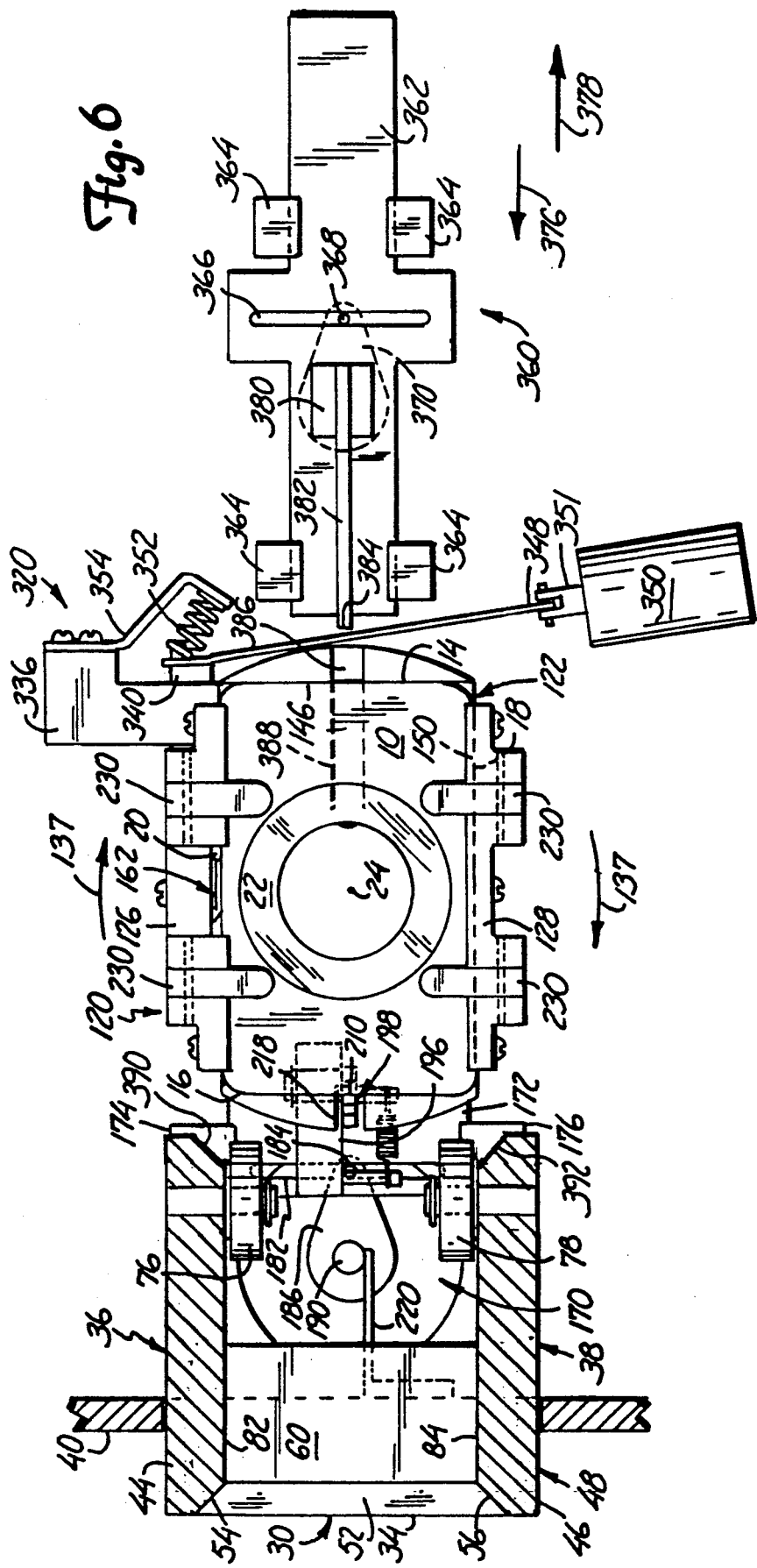
FIG. 6 is a sectional view as taken along lines 6—6 in FIG. 2.

As the leading edge of the data card 10 exits the roller assembly 70, it is pushed by the rollers onto a card spinner assembly 120 (see FIGS. 2 and 6). The card spinner assembly 120 has a card holder or turntable 122 defined by a body portion 124 and left and right side rails 126 and 128, respectively, which are secured to the body portion 124 by fasteners 129. The turntable 122 has a lower base portion 130 which, in combination with body portion 124, is fixedly mounted about a drive shaft 132. The drive shaft 132 is coupled to a turntable drive motor 134 for rotating the turntable 122 about an axis 136 defined by the drive shaft 132. Preferably, the turntable 122 is rotated clockwise (as viewed in FIGS. 6 and 7), as indicated by arrow 137. The motor 134 is mounted to and under a base plate 138, which in part defines the support chassis for the data transfer system 25, and the drive shaft 132 extends up from the motor 134 through an opening 139 in the base plate 138 to the turntable 122. The turntable 122 is thus supported via drive shaft 132 over the base plate 138. Although the turntable 122 is rotatable about axis 136, it must be fixed in a card insertion position, as illustrated in FIGS. 2, 5 and 6, for acceptance of the data card 10.

Figure 7:
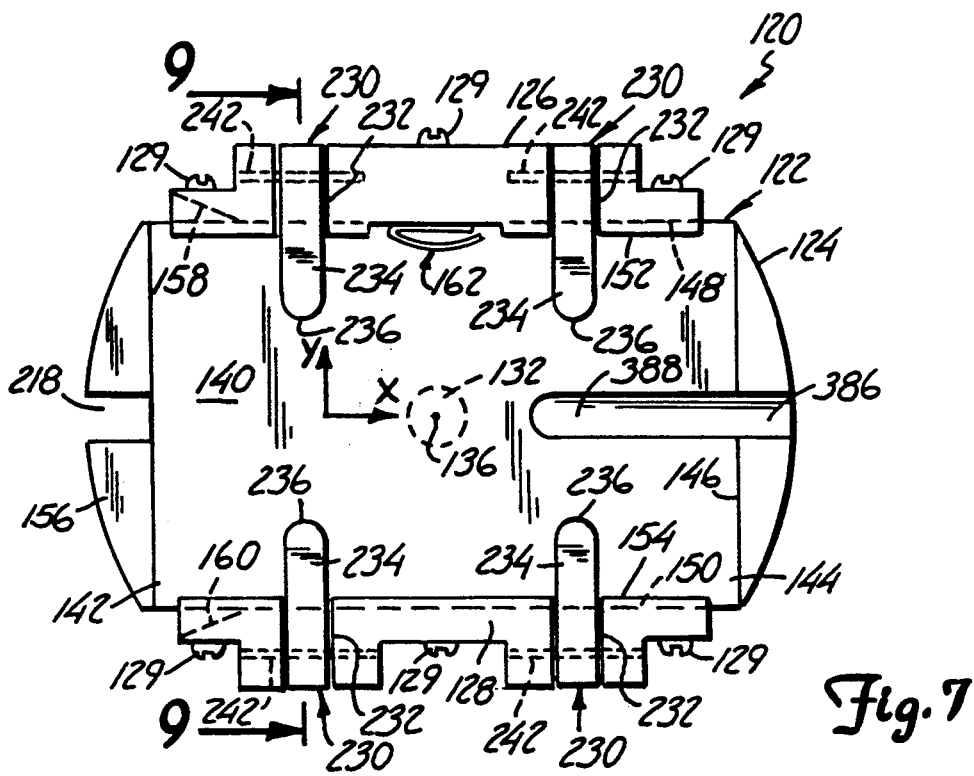
FIG. 7 is an enlarged plan view of a rotatable card holder of the present invention.

The body portion 124 of the turntable 122 provides a generally planar support area for the bottom side of the data card 10, and is preferably configured as a flat card support surface 140 (see FIGS. 7 and 9) which is perpendicular to the axis 136 of the turntable 122. A longitudinal channel is defined along surface 140 for the data card, with a first end 142 of the channel being open. At a second end 144 thereof, the channel is closed by a lateral end wall 146. The sides of the channel are defined by opposed side walls 148 and 150 of the left and right side rails 126 and 128, respectively. As seen in FIG. 7, the left side rail 126 has an upper lip 152 which extends inwardly from the side wall 148 and over the channel to retain the data card 10 therein. Similarly, the right side rail 128 has an overhanging lip 154 extending inwardly from the side wall 150 and over the channel to retain the data card 10 therein.

At its open end, the card support surface 140 has a downwardly beveled entry ramp 156 to facilitate alignment of the leading edge 14 of the data card 10 onto the card support surface 140 and into the channel. In addition, the left and right side rails 126 and 128 have sloped card alignment surfaces 158 and 160 leading to their respective side walls 148 and 150 at the open end of the channel.

The lateral end wall 146 and right side wall 150 are precision locating surfaces for the data card 10 on the turntable 122, relative to the annular data storage region 22 on the card. As seen in FIG. 6, the leading edge of the data card 10 (such as end edge 14) engages the lateral end wall 146 when the card 10 is fully inserted onto the turntable 122. The desired alignment of the card is such that the right side edge of the card (such as edge 18) is engaged the with right side wall 150. This engagement is attained by means of a leaf spring 162 mounted on the left side wall 148 (as shown in FIGS. 6 and 7). The leaf spring 162 is biased outwardly from the left side wall 148 so that as a card 10 is inserted into the channel of the turntable 122, it engages the leaf spring 162 along its left side edge (card edge 20), thereby urging its opposite side edge (card edge 18) into engagement with the right side wall 150. The leaf spring 162 also serves to retain the card 10 generally in place against the end wall 146 as well. These precision locating surfaces serve to correctly position the annular data storage region 22 for data transfer, while the support surface 140 serves to place the region 22 in a plane perpendicular to the axis 136 of the turntable 122.

Card Insertion Device

In order to attain precise alignment of the data card 10 on the turntable 122, it is imperative that the card be completely inserted onto the turntable (i.e., that the leading edge 14 of the card 10 be in abutting engagement with the lateral end wall 146). To ensure that the card is fully inserted, a card insertion device 170 is provided which engages a trailing end of the card as it exits the nip 80 of the roller assembly 70 and pushes the card onto the turntable 122 until its leading edge 14 engages the lateral end wall 146. The card insertion device 170 has a small amount of overtravel to fully seat the card 10 in such an end edge abutting position.

Figure 8:
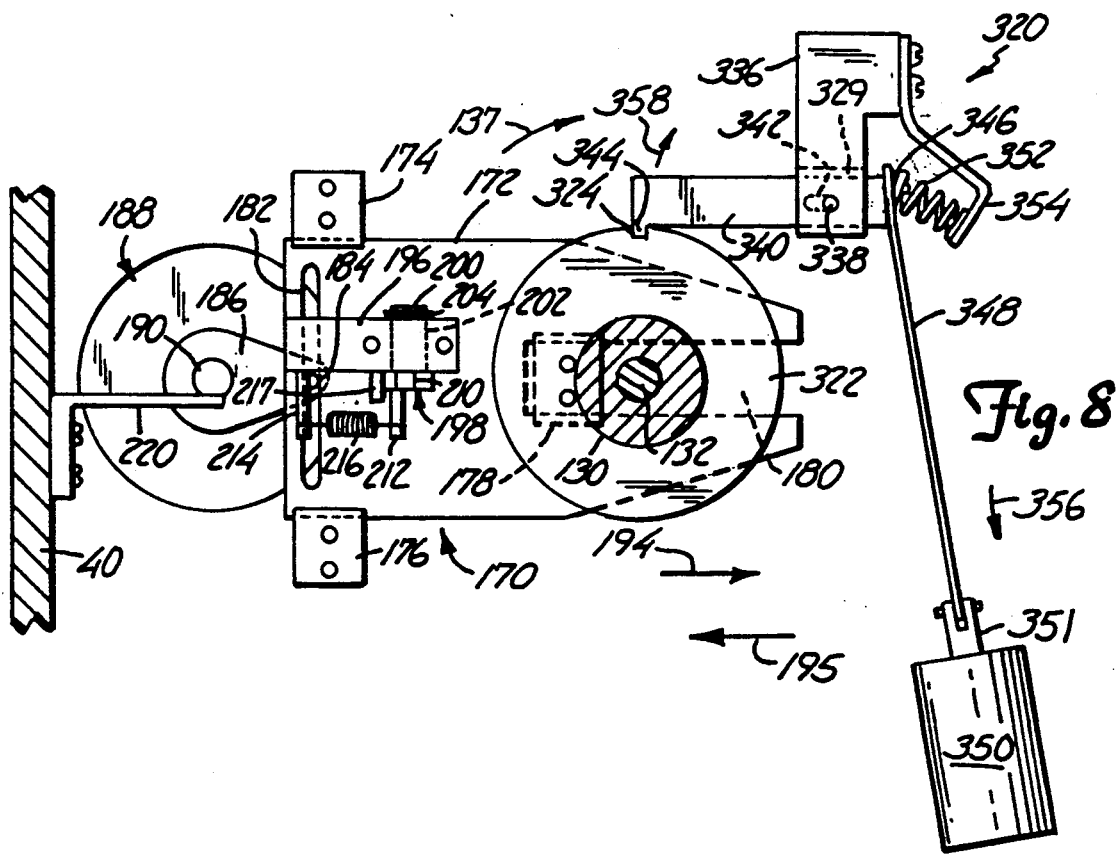
FIG. 8 is a plan view of a card insertion device, and further illustrating a card holder stop alignment device, with some parts of the data transfer system removed or shown in section for clarity.

The card insertion device 170, as illustrated in FIGS. 2, 5, 6 and 8, has a slide plate 172 which is mounted on the base plate 138 for longitudinal linear movement under the card path. The slide plate travel path is defined by left and right guides 174 and 176, and a center guide 178. The guides 174 and 176 engage and overlap longitudinal side edges of the slide plate 172, while the center guide engages and overlaps a longitudinal central slot 180 at one end of the slide plate 172. As illustrated in FIG. 8, the slot 180 is provided to facilitate movement of the slide plate 172 past the drive shaft 132 of the turntable 122.

The slide plate 172 has a lateral slot 182 extending therethrough. The slot 182 is adapted to slidably receive an upright pin 184 which is fixedly mounted on the outer end of an eccentric crank 186. The crank 186 is recessed in an aperture 188 in the base plate 138, as illustrated in FIG. 2, and fixedly secured to a shaft 190 which extends into the aperture from a motor 192 mounted to and below the base plate 138. Actuation of the motor 192 rotates the crank 186 and the pin 184 mounted thereon, and the slot 182 "follows" the pin 184 as it moves back and forth laterally across the slot 182. Such motion causes the slide plate 172 to slide longitudinally back and forth in the alternate directions indicated by arrows 194 and 195 in FIG. 8. For each rotation of the crank 186 about the axis of the shaft 190, the slide plate 172 moves through one back and forth cycle under the roller assembly 170 and card spinner assembly 120.

An upright mount 196 is secured on top of the slide plate 172. A finger 198 is fixedly mounted on a pivot shaft 200 which is freely pivotally received in a lateral bore 202 through the mount 196. A retainer 204 is secured to the end of the shaft 200 to secure it and the finger 198 thereon to the mount 196. The finger 198 has an upper portion with a card engagement surface 210 thereof and a lower portion with a first lateral pin 212 extending therefrom. A second lateral pin 214 is fixedly mounted to the mount block 196, and extends in the same direction laterally therefrom as the first pin 212.

Each end of a coil spring 216 is mounted to the pins 212 and 214, with the spring 216 urging the finger into a generally upright position as illustrated in FIG. 2. A stop pin 217 on the block 196 engages the lower portion of the finger 198 to stop it from further pivoting under the bias force of the spring 216 and to define the upright position of the finger 198. In its upright position, the finger 198 enters the card path and can thus engage a trailing end of the data card 10 after it exits the nip 80 of the roller assembly 70. Movement of the finger 198 to the right (as seen in FIGS. 2, 6 and 8) causes the finger 198 to engage the card and push it onto the turntable 122. The body portion 124 of the turntable 122 has a slot 218 to permit movement of the finger 198 longitudinally to an extent to push the leading edge 14 of the card into engagement with the lateral end wall 146 on the turntable 122. The position of the finger 198 within the slot 218 is illustrated in FIGS. 2 and 6. In this position, the slide plate 172 upon which the finger 198 is carried is moved to its right-most extent by activation of the motor 192. A slight amount of overtravel is provided so that when the slide plate 172 is moved to its right-most extent, the surface 210 of the finger 198 pivots backward slightly (to the left as viewed in FIG. 2) against the bias of the spring 216. The spring 216 thus further urges the leading edge 14 of the data card 10 into engagement with the lateral end wall 146. The card insertion assembly 170 works in combination with the leaf spring 162 on the turntable to fully align the card so that the axis 24 of the annular data storage region 22 on the card 10 is coaxial with the rotational axis 136 of the turntable 122.

In order to move the finger 198 out of the card path to permit data card movement through the roller assembly 70, the slide plate 172 is moved to its left-most extent as seen in FIG. 5, by activation of the motor 192. An injector stop bar 220 is mounted on end wall 40 (as best seen in FIGS. 5 and 8), and is aligned to engage the pin 212 on the finger 198 when the slide plate 172 is moved to the left, as seen in FIG. 5. The stop bar 220 is of a length such that when it engages the pin 212, and the slide plate 172 continues moving to the left, the finger 198 pivots about the axis defined by its pivot shaft 200 to a position as seen in FIG. 5, wherein the finger 198 is below the card path defined by and between the insertion slot 30 and the nip 80. In this position, the finger 198 is pivoted against the bias of the spring 216 whereby the spring 216 is additionally placed in tension (extended). The finger 198 is thus movable between an inactive position aligned under the roller assembly 70 where it does not interfere with movement of the card along the card path, and an active position in the card path to engage a trailing end of the card.

In use, the motor 192 is activated for one cycle of the crank 186. The components of the insertion assembly 170 are initially positioned as seen in FIG. 5. The motor 192 is activated to rotate the crank 186 and move the slide plate 172 to the right, until the components are configured as illustrated in FIG. 2, 6 and 8. The motor 192 is thus activated to move the finger 198 into position to engage the trailing edge 16 of the data card 10 as it leaves the nip 80 of the roller assembly 70. This ensures a smooth continuous movement of the data card 10 along the card path and onto the support surface 140 of the turntable 122. As stated, in this position the finger 198 achieves a slight amount of "overtravel" to affirmatively push the data card 10 against the lateral end wall 146 on the turntable 122. The motor 192 continues to run through its single cycle, thereby moving the crank 186 back to the position shown in FIG. 5 and pivoting the finger 198 back to its inactive position. Once the components of the card insertion assembly 170 are in the position shown in FIG. 5, the motor 192 is deactivated.

Turntable Flyweights

After the data card 10 has been fully loaded onto the turntable 122 and aligned relative to lateral end wall 146 and side wall 150, the data transfer system 25 is ready for rotation of the turntable 122 to effectuate data transfer to or from the data card 10. In order to maintain the data card 10 in an immobile position relative to the turntable 122 during rotation thereof, a plurality of card hold-down flyweights 230 are provided on the turntable 122.

Figure 9:
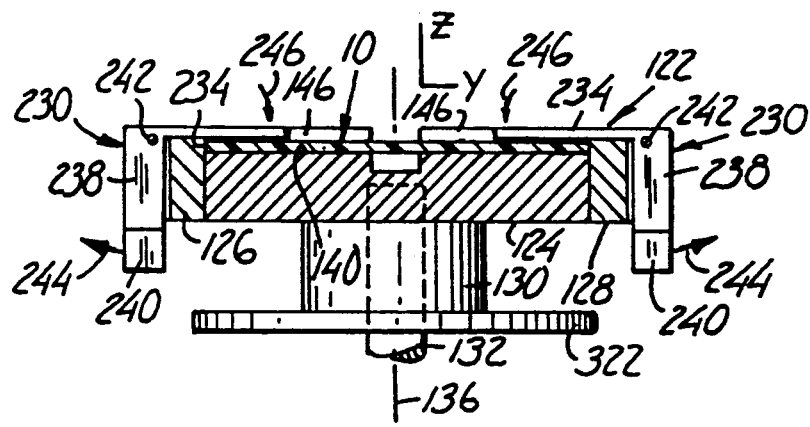
FIG. 9 is a sectional view as taken along lines 9—9 in FIG. 7 (with a data card shown in place on the card holder).
Figure 10:
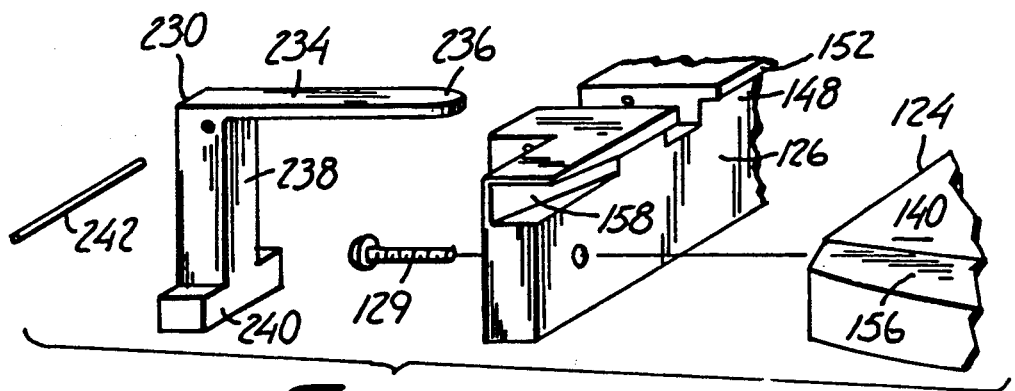
FIG. 10 is an exploded perspective view of a corner portion of the card holder and one of its associated flyweights.

The side rails 126 and 128 of the turntable 122 have a lateral cutout 232 to accommodate each flyweight 230. Each flyweight 230 has an upper tab portion 234 that extends generally horizontally, with the upper tab portion 234 having smooth sides, rounded edges and a rounded outer end 236. A main body portion 238 extends downwardly and generally perpendicular from the upper tab portion 234, and is of increased mass with respect thereto. A further increased mass segment 240 is preferably provided at a bottom end of main body portion 238, as best seen in FIGS. 9 and 10.

Each flyweight 230 is pivotally mounted to its respective side rail of the turntable 122 by a pivot pin 242. As seen in FIGS. 7 and 9, the upper tab portion 234 of each flyweight 230 extends over the card support surface 140 of the turntable122, and over a data card 10 inserted thereon (see FIG. 9). Each pivot pin 242 is generally aligned along an axis perpendicular to the axis of rotation 136 of the turntable 122. Accordingly, rotation of the turntable 122 about is axis 136 causes each flyweight 230 to pivot about its pivot pin 242, with its lower greater mass segment 240 pivoting outwardly by centrifugal force, as indicated by arrows 244 in FIG. 9. This in turn causes the upper tab portion 234 of each counterweight 230 to pivot downwardly against the data card 10 in the turntable 122, as indicated by arrows 246 in FIG. 9. As depicted in FIG. 6, the flyweights 230 may be spaced around the turntable 122. In no event, however, should a flyweight 230 be aligned so that its upper tab portion 234 is over the annular data storage region 22 of the card 10.

The movement of each flyweight 230 caused by rotation of the turntable 122 thus presses the data card 10 flat against the card support surface 140. The data card 10 is therefore held in position for data transfer purposes on the rotating turntable 122, with the card 10 fixed in all three axes x-y-z relative to the rotating turntable 122. As the rate of rotation of the turntable 122 is increased, the centrifugal force acting on the lower mass segment 240 of each flyweight 230 is also increased, thereby creating a greater downwardly urging force by the upper tab portion 234 of the flyweight 230 on the first planar side 12 of the data card 10. The card holding force exerted by each flyweight 230 is thus a function of the rate of rotation of the turntable 122 and card 10 thereon.

Data Transfer Assembly

Once the data card 10 and turntable 122 are rotated to a desired rate of rotation for data transfer, a data transfer assembly 250 is activated to scan the annular data storage region 22 of the spinning card. In this regard, the scanning function may include reading, writing or erasing information on the data card 10. Although data may be recorded on the annular data storage region 22 in concentric tracks, it is preferable to align the data in a single spiral track. The data transfer assembly 250 thus follows that single spiral track of the data card 10 as it spins about the axis 24 of the annular data storage region 22 (which is coaxial with the turntable axis 136).

As illustrated in FIG. 2, the data transfer assembly 250 is positioned above the turntable 122. In an embodiment of the present invention wherein the annular data storage region 22 is optical media, the data transfer assembly 250 includes an optical table 252 for supporting the necessary optical components to optically scan the data card 10 (e.g., mirrors, beam splitters, diffractors, etc.). A final laser beam focusing lens 254 is illustrated in FIG. 2, supported by a lens mount 256 which also supports a mirror 258. The lens mount 256 is mounted to the optical table 252, along with additional components of the optical system (including a laser beam generator) as shown diagrammatically in FIG. 11 as optical components 260. The components 260 generate a beam of radiant energy (laser beam) 262 which is reflected by mirror 258 to lens 254, which then focuses the beam 262 onto the data track on the annular data storage region 22 of the data card 10.

Figure 11:
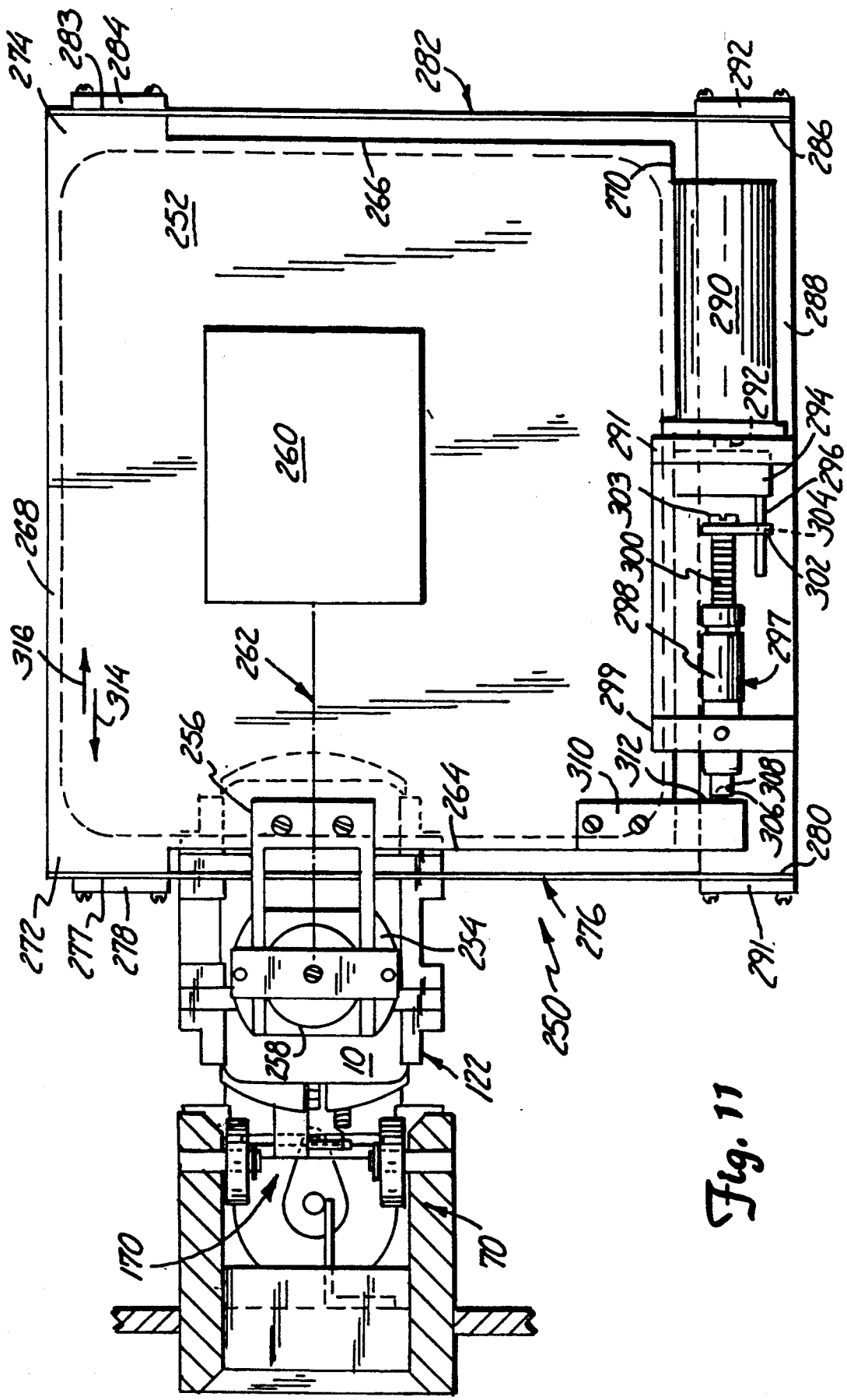
FIG. 11 is a plan view of the data transfer system showing primarily its data transfer assembly, with some parts broken away for clarity.

The table 252 is movable relative to the turntable 122 generally along a radius extending outwardly from the axis 24 of the annular data storage region 22 on the data card 10. A preferred embodiment for achieving such relative movement of the optical table 252 is illustrated in FIG. 11. The support block 256 for the mirror 258 and lens 254 is mounted along a first side edge 264 of the table 252. The table has an opposite second side edge 266 and a pair of opposite end edges 268 and 270. Ears 272 and 274 project outwardly from respective side edges 264 and 266 of the table 252, adjacent its end edge 268. An elongated steel leaf spring arm 276 is mounted at a first end 277 thereof to ear 272 by a spring keeper 278, and extends generally along the side edge 264 of the table 252 to a second end 280 (which extends beyond the end edge 270 of the table 252). Similarly, an elongated steel leaf spring arm 282 is secured at its first end 283 to ear 274 by a spring keeper 284 and extends generally along the side edge 266 to a second end 286 thereof (which likewise extends beyond end edge 270 of the table 252). The second ends 280 and 286 of the spring arms 276 and 282 are in turn secured to a support platform 288 by suitable spring keepers 291 and 292, respectively. The support platform 288 is in turn mounted to the base plate 138.

The spring arms 276 and 282, in combination with the table 252 and support platform 288, thus form a trapezoid assembly which provides rigid support for the optical components of the data transfer assembly 250 over the turntable 122. The spring arms 276 and 282 are bendable so that this trapezoidal arrangement supports the table 252 in cantilever fashion and provides a single degree of freedom for table movement, generally along the radius of the annular data storage region 22 for optically tracking the data tracks thereof. As illustrated in FIGS. 2 and 11, the optical table 252 is at its initial position for scanning the data card 10, with the spring arms 276 and 282 extending generally parallel to one another and perpendicular to the support 288. In this position, the laser beam 262 is aligned to impinge on an innermost track of the data storage region 22. To scan the information on the card, the table 252 is moved to the left (as viewed in FIGS. 2 and 11) to move the laser beam radially outwardly relative to the annular data storage region 22, at a rate which matches the track pitch and spinning rate of the card 10.

The force for moving table 252 is provided by a reversible motor 290 mounted on a motor mount 291 on the support platform 288. Motor 290 rotates a drive shaft 292 which extends through an aperture in the motor mount 291 and is secured to a pin holder 294, which in turn has a pin 296 mounted thereon. The pin 296 is aligned parallel to the axis 292, but is not colinear. In order to translate the rotational motion of the motor 290 to linear motion, a micrometer 297 has its body 298 mounted to the support platform 288 (via micrometer mount 299) with its micrometer barrel 300 coaxially aligned with the axis of drive shaft 292. A micrometer lever 302 is secured to a first end 303 of the micrometer barrel 300 (adjacent the motor 290) and has a hole 304 therethrough for slidable reception of the pin 296. Accordingly, rotation of the pin holder 294 causes the pin 296 to rotate about the axis of the micrometer barrel 300. The micrometer lever 302 follows the pin 296 and thus causes rotation of the micrometer barrel 300 relative to the micrometer body 298 (in which the barrel is threadably mounted). The micrometer barrel 300 thus moves linearly relative to its body 298 in response to rotation of the drive shaft 292 of the motor 290.

At a second end 306 of the micrometer barrel 300, the micrometer barrel 300 has a ball 308 embedded therein to provide a single point contact at that end of the micrometer barrel 300. A drive arm 310 is mounted to the table 252 and aligned to present a planar contact surface 312 to the ball 308 on the end of the micrometer barrel 300. The axes of drive shaft 292 and the micrometer 297 are aligned generally parallel to the longitudinal card path for the data card and perpendicular to the support arms 276 and 282.

Linear movement of the micrometer barrel 300 thus causes likewise linear movement of the table 252, either in the direction of arrow 314 (as the barrel 300 is extended) or in the opposite direction of arrow 316 (as the barrel 300 is retracted). The support arms 276 and 282 "give" and bend in response to the force applied against drive arm 310 by the micrometer barrel 300, thus permitting table movement. In a preferred embodiment, the extent of movement is only 0.375 inch (the radial width of the annular data storage region 22). The table 252 is moved at a rate which matches the track pitch and spinning rate of the data card 10. Although the table is moved only a relatively small distance, some small runout (non-linearity) does occur because the spring arms 276 and 282 are inextensible. However, the data transfer assembly 250 compensates for such runout. In the optical embodiment illustrated, the lens 254 includes a conventional TAOHS tracking head servo to follow track eccentricities on the annular data storage region 22. The tracking servo generates a DC offset signal and is coupled to the motor 290 to control speed, always driving the motor 290 to keep the offset signal close to zero. Even with this type of tracking servo, precise location of the data transfer assembly 250 over the data card 10 is necessary to keep track eccentricity within the dynamic range of the tracking servo.

In one embodiment, the annular data storage region of the data card is optical magnetic media which can be read, written on or erased. However, for magneto-optic erasing and writing, a magnetic field must be provided closely adjacent to the media. Thus, a magnet suitable for creating such a magnetic field is provided in or adjacent to the magnetic head suspended over the turntable, since it would be impractical to provide such a magnetic field generation arrangement on the turntable itself (below the card).

In an embodiment of the present invention wherein the annular data storage region is formed from magnetic media, the media will have a concentric groove accessible from the first planar side of the data card, and actual contact is then necessary between the data transfer assembly and that groove in order to read, write or erase information on the data card. In such an embodiment, the data transfer assembly takes a very different form from that illustrated in FIGS. 2 and 11. All that is necessary is a pivotal arm, like a phonograph record arm, which has a suitable magnetic contact head at a distal end thereof. Once the data card is aligned on the turntable and rotated, the head is pivoted over the card and lowered into contact with the annular data storage region, with some light downward spring load on the head to seat it in the track. As the card is rotated, the head thus follows the track on its own, without the necessity for a motor to move the arm relative to the spinning card. When the end of the spiral data track is reached, or the data transfer function is complete, the arm and head are then lifted away from the card to permit its withdrawal from the turntable.

Card Spinner Brake Assembly

As previously noted, the turntable 122 must be aligned as seen in FIGS. 2 and 6 to allow insertion of the data card 10 onto the turntable 122. A brake assembly 320 is provided for this purpose, to selectively engage and align the turntable 122.

As seen in FIGS. 6 and 8, the brake assembly 320 includes an annular plate 322 fixedly mounted about the drive shaft 132 above the base plate 138. The plate 322 has a single notch or stop 324 in its outer circumference. A support 336 is mounted to the base plate 138 and has a support pin 338 extending vertically between a generally horizontal slot 329 through one end of the support 336. A brake arm 340 is received within the slot 329 and itself has a horizontal slot 342 for sliding reception of the pin 338. At a first end thereof (on one side of the pin 338), the brake arm 340 has a finger 344 configured to engage the notch 324 in the plate 322. At a second end thereof (on the other side of the pin 338), the brake arm 340 has a connector tab 346. An inextensible link 348 is apertured at both ends, with one apertured end thereof being pivotally mounted over the tab 346. A linear actuator, such as a solenoid 350, is mounted to the base plate 138 and has its actuator arm 351 pivotally connected to the other apertured end of the link 348, as illustrated in FIG. 8.

The tab 346 on the second end of the brake arm 340 is also engaged by a coil spring 352 which is maintained in compression against the brake arm 340 by a spring plate 354 mounted to the support 336. The spring 352 is aligned against the brake arm 340 to urge its finger 344 toward the plate 322. The spring 352 also urges the brake arm 340 to the left (as viewed in FIG. 8) along its slot 342 and relative to the pin 338. Upon rotation of the notch 324 into alignment with the finger 344, those components engage and the plate 322 is prevented from further rotation, thereby preventing the turntable 122 attached thereto from further rotation as well. The turntable 122 is then positioned as seen in FIGS. 2 and 6 for card insertion (and for card removal, when the card insertion device is in its inactive position (FIG. 5)).

To permit rotation of the turntable 122, the solenoid 350 is activated to retract its actuator arm 351 and pull the link 348 linearly toward the solenoid 350 (in direction of arrow 356 in FIG. 8). This pivots the brake arm 340 about pin 338 (in direction of arrow 358 in FIG. 8) to disengage the finger 344 and notch 324 and further compress the spring 352. Once the finger 344 and notch 324 are disengaged, the turntable 122 is then free to rotate about its axis 136.

The spinning of the turntable 122 must be stopped gently to avoid damage to the system components and card 10. When it is desired to cease rotation of the turntable 122, the turntable motor 134 is slowed from a high rate of rotation (a data transfer rate) to a very slow rate of rotation. Once the turntable rotation has been slowed, the solenoid 350 is deactivated. The bias force of the spring 352 urges the first end of the brake arm 340 toward the plate 322 to allow the finger 344 to ride along the circumference of the plate 322 until it falls into and engages the notch 324 thereof. The turntable continues to slowly rotate in a clockwise direction (see arrow 137 in FIG. 8), but even at a relatively small rate of rotation, the rotational forces of the turntable are translated into relatively significant linear vectors on the brake arm 340 when the finger 344 and notch 324 finally engage. The slot 342 is provided to accommodate this and lessen jarring of the card spinner assembly 120 when the brake assembly 320 is engaged. The spring 352 also serves to act as a "shock absorber" in this regard.

Card Ejection Assembly

When rotation of the turntable 122 has stopped and the turntable has been locked in position by the brake assembly 320, the data card 10 can be moved back along the card path and out of the data transfer system 25 via slot 30. The roller assembly 7 is again activated to rotate its upper rollers 72 and 74, but in an opposite direction (clockwise s viewed in FIG. 5). When the data card 10 is moved from the turntable 122 back into the nip 80 defined by the roller assembly 70, the roller pairs 72, 76 and 74, 78 grip the edge areas of the card and pull the card off of the turntable 122 (to the left as viewed in FIGS. 2 and 6) and push the data card 10 back into the slot assembly 48, with a portion of the card finally extending through and beyond the slot 30. The card then stops in this position, resting in the slot assembly 48 for retrieval by an operator.

The first step in removing a data card 10 from the data transfer system 25 is getting the card 10 off of the turntable 122. For this purpose, a card ejection device 360 is provided, as seen in FIGS. 2 and 6. The card ejection device 360 engages edge 14 of the card (now the trailing edge as the card moves in reverse along the card path) and pushes the card off of the turntable 122 until its edge 16 (now the leading edge) enters the nip 80 of the roller assembly 70.

The card insertion device 360 has a slide plate 362 which is mounted on the base plate 138 for longitudinal linear movement. The slide plate travel path is defined by a plurality of guides 364 which engage and overlap longitudinal side edges of the slide plate 362 and hold the slide plate 362 spaced above the base plate 138 (see FIG. 2).

The slide plate has a lateral slot 366 extending therethrough. The slot 366 is adapted to slidably receive an upright pin 368 which is fixedly mounted on the outer end of an eccentric crank 370. The crank 370 is in turned secured to a shaft 372 which extends through an aperture in the base plate 138 to a motor 374 mounted to and below the base plate 138. Actuation of the motor 374 rotates the crank 370 and the pin 368 mounted thereon, and the slot 366 "follows" the pin 368 as it moves back and forth laterally across the slide 366. Such motion causes the slide plate 362 to slide longitudinally back and forth in the alternate directions indicated by arrows 376 and 378 (see FIG. 6). For each rotation of the crank 370 about the axis of the shaft 372, the slide plate 362 moves through one back and forth cycle relative to the stationary turntable 122.

An upright mount 380 is secured on top of the slide plate 362. A pusher arm 382 is fixedly mounted on the mount 380 and extends longitudinally relative to the card path at the same height as the data card 10 on the turntable 122. At its outermost end, the pusher arm 382 has a card engagement surface 384. Movement of the pusher arm 382 to the left (as viewed in FIGS. 2 and 6) causes the card engagement surface 384 of the pusher arm 382 to engage the edge 14 of the card 10 and push the card off of the turntable 122. The body portion 124 of the turntable 122 has a slot 386 to permit movement of the pusher arm 382 longitudinally to an extent to push the edge 14 of the card 10 into engagement with the nip 80 of the roller assembly 70. The card support surface 140 also has a recessed channel 388 therein to facilitate movement of the pusher arm 382. Both the slide plate 362 and the pusher arm 382 travel over the link 348 of the brake assembly 320 and thus do not interfere therewith.

During insertion of the card 10 onto the turntable 122 and rotation of the turntable 122, the pusher arm 382 is moved out of the card path by moving the slide plate 362 to its home position or right-most extent, as illustrated in FIGS. 2 and 6. This is accomplished by actuation of the motor 374. In use, the motor 374 is activated for only one cycle of the crank arm 370. The motor 374 is activated to rotate the crank 370 and move the slide plate 362 to the left. The slide plate 362 thus slides longitudinally under the turntable 122, while the pusher arm 382 slides longitudinally over the turntable 122 and its card engagement surface 384 engages the edge 14 of the card 10. The rate of linear movement of the pusher arm 382 is mated to the rate of card travel through the roller assembly 70, so that the card is smoothly transferred from the turntable 122 to the roller assembly 70 and on to the slot 30. The motor 374 continues to run through its single cycle, thereby moving the crank 370 back to the position shown in FIGS. 2 and 6 to retract the pusher arm 382 from the card path. Once the components of the card ejection assembly 360 are moved back to the position shown in FIGS. 2 and 6, the motor 374 is deactivated. To prevent possible binding of the card 10 as it travels back long the card path, the inner ends of the left and right card guides 36 and 38 have respective bevelled surfaces 390 and 392 (see FIG. 6), and the inner ends of the top and bottom card guides 32 and 34 have respective bevelled surfaces 394 and 39 (see FIG. 5).

System Control and Operation

The data transfer system 25 operates automatically to coordinate the functions of the components of the system once a card has been inserted into slot 30. The card is thus pulled into the system, moved along the card path into position on the turntable, rotated and scanned by the data transfer assembly and then moved back along the path to the slot 30.

The operation of the system components is assisted by a series of sensors which detect the presence of the card along the card path, or which detect the movement and/or position of system components. In FIG. 12, an arrangement of seven sensors is shown in relation to the basic system components which serve to coordinate the functional operation of the data transfer system 25. It is essential that all components of the data transfer system 25 be interlocked functionally so that the data card 10 is correctly and carefully handled, as well as to achieve the correct transfer of information to or from the data card 10.

A first sensor 400 is positioned in the card path between the slot assembly 48 and roller assembly 70. The sensor 400 detects the presence of a data card 10 when inserted into the card path through slot 30.

A second sensor 402 is positioned in the card path between the roller assembly 70 and the turntable 122. The second sensor 402 also serves to detect the presence of a card in the card path as it moves between the roller assembly 70 and turntable 122.

A third sensor 404 is positioned adjacent the insertion assembly slide plate 172. A tab 405 is secured to the slide plate to move therewith as it traces its linear path. The third sensor 404 is positioned so that when the slide plate 172 is in its left-most position (with the finger thereon fully retracted under the card path), the sensor 404 detects the presence of the tab 405.

A fourth sensor 406 is positioned adjacent the brake arm 340 of the brake assembly 320. The fourth sensor 406 detects whether the brake arm 340 has been pivoted away from the annular plate 322 (to a brake released position).

Fifth and sixth sensors 408 and 410 detect the position of the optical table 252 of the data transfer assembly 250. The sensors 408 and 410 are supported by a mounting plate 409 to the support 288 of the data transfer assembly 250. A tab 411 is secured to the table 252 to move therewith. The fifth and sixth sensors 408 and 410 are spaced apart to define the length of travel of the table 252. The fifth sensor 408 detects the presence of the tab 411 when the table 252 is in its initial position for scanning, while the sixth sensor 410 detects the presence of the tab when the table 252 has been moved to its end-of-travel position wherein the outermost track of the annular data storage region 22 has been traversed by the data transfer assembly 250.

A seventh sensor 412 is positioned adjacent the slide plate 362 of the card ejection assembly 360. A tab 413 is affixed to the slide plate 362 to move therewith as it traces its linear path. The seventh sensor 412 is positioned so that when the slide plate 362 is in its right-most position (when the card ejection assembly 360 is fully retracted from the card path), the sensor 412 detects the presence of the tab 413.

These seven sensors (which are preferably optical sensors), the drive motors 88, 134, 192, 374 and 290 and the solenoid 350 are all interlinked for coupled and controlled operation of the data transfer system 25, preferably by a microprocessor controller which coordinates the function of the various components of the system 25, as a function of the signals provided by the sensors, for efficient and effective operation of the system.

In operation, a data card 10 is inserted into the slot 30. The first sensor 400 detects the presence of the card (which has an opaque body) and, as a result, the roller motor 88 is activated to rotate the rollers of the roller assembly 70 (rollers 72 and 74 rotate counterclockwise as viewed in FIG. 5) and the insertion device motor 192 is activated. The card 10 is pulled into the data transfer system 25 by the roller assembly 70, and as the trailing edge of the card exits the nip 80 of the roller assembly 70, the finger 198 of the card insertion assembly 170 engages that edge of the card and pushes it completely onto the turntable 122 of the card spinner assembly 120.

As the card 10 exits the roller assembly 70, the second sensor 402 detects the presence of the card. Once the card has fully passed the second sensor 402, the absence of the card is noted by the sensor 402 and, as a result, the roller motor 88 is deactivated and the solenoid 350 is energized, thus releasing the turntable 122, for rotation. The third sensor detects the presence of the tab 405 when the card insertion assembly 170 returns to its home position and, as a result, deactivates the motor 192 therefor after its single cycle operation.

The fourth sensor 406 detects the brake arm 340 as it is pivoted into its brake release position from the plate 362 of the card spinner assembly 120 and, as a result, activates the turntable motor 134 to rotate the turntable 122. The motor 134 drives the turntable 122 to a desired rate of rotation for scanning the annular data storage region 22 on the card 10. Once that rate of rotation is attained (as measured by a time delay or suitable rotation speed sensor), the data transfer components are energized (e.g., the laser beam 262 is generated and directed to the annular data storage region 22), and the drive motor 290 for the optical table 252 is activated to move the table 252 radially relative to the annular data storage region 22 on the spinning card 10. The data card 10 is held securely in the rotating turntable 122 and flattened for data scanning by the hold-down flyweights 230.

When the optical table 252 has reached the end of its travel, the tab 411 thereon is detected by the fifth sensor 408 and, as a result, the table drive motor 290 is deactivated. Alternately, a microprocessor controller may terminate the travel of the optical table 252 and scanning of the card after certain tracks have been scanned or data addresses located, read and/or written on the card. In either event, a scan termination signal is provided to deactivate the table drive motor 290 and also to slow down the rate of rotation of the turntable motor 134 to a predetermined, very slow rate of rotation. Once this rate of rotation is achieved (as measured by a time delay or suitable sensor), the solenoid 350 is de-energized. The brake arm 340 is urged back against the slowly rotating plate 322 by the spring 352 and eventually, the finger 344 engages the slot 324 to completely stop the turntable 122 from spinning, and to align the turntable 122 for ejection of the card therefrom.

Once the desired portions of the annular data storage region 22 have been scanned, the optical scanning system is de-energized, and the optical table 252 can then be returned to its initial scanning position (the position shown in FIGS. 2 and 11). To accomplish this end, the drive motor 290 is energized in reverse to move the table 252 back from its runout position. The sixth sensor 410 detects the tab 411 on the table 252 when the table has returned to its home position and, as a result, deactivates the drive motor 290. The data transfer assembly 250 is thus positioned to begin a new scanning cycle when another card has been positioned in the card spinner assembly 120.

When the solenoid 350 is de-energized, the brake arm 340 pivots back to its brake engaging position. The absence of the brake arm 340 is then noted by the fourth sensor 406 and, as a result, the turntable motor 134 is completely deactivated, the ejector motor 374 is activated and the motor 88 for the roller assembly 70 is again activated (in reverse). The card ejection assembly 360 thus pushes the card 10 off of the turn table 122 and into the nip 80 of the roller assembly 70, which then carries the card 10 out to the slot assembly 48 and slot 30 for retrieval by an operator. The seventh sensor 412 detects the tab 413 on the slide plate 362 when the card ejection assembly 360 returns to its home position after a single cycle of the motor 374 thereof and, as a result, deactivates the ejector motor 374.

As the card 10 moves back past the first and second sensors 400 and 402, its presence and absence are again detected. The card 10 rests in the slot assembly 48 until removed by an operator via slot 30. Once the card 10 has been taken out of the slot 30, the absence of the card is noted by the sensor 400 and, as a result, the roller drive motor 88 is then deactivated. Until the card 10 has been removed from the system 25, the roller drive motor 88 continues to rotate the rollers 72 and 74 to prevent reinsertion of that card.

The direction of rotation of the roller assembly motor 88 is a function of the order of card detection by the first and second sensors 400 and 402. For instance, if the card 10 is detected first by sensor 400 and then by sensor 402, the direction of roller rotation the next time the roller drive motor 88 is activated will be such to eject the card from the system 25. Likewise, if the order of detection of the card in the card path is first detected by sensor 402 and then by sensor 400, the next activation of the motor 88 for the roller assembly 70 will be in a mode to insert a card into the data transfer system 25. In this manner, the system 25 has a means for knowing whether a card 10 is lodged on the turntable.

Conclusion

The apparatus and method of the present invention is an unique and efficient arrangement for transferring data to and from a card which has an annular data storage region thereon. The present invention handles the card carefully to accomplish such a data transfer, yet permits high speed rotation of the card relative to a data transfer head for quickly and accurately scanning the annular data storage region of the card. To achieve this end, the card is transported to a rotatable turntable and mounted thereon. During rotation of the turntable, self-acting flyweights mounted on the turntable act to flatten the card and hold it in a fixed position in all axes relative to the turntable, so that the necessary high accuracy alignment of the annular data storage region on the card relative to a non-rotating data transfer head is attained. The invention further provides means for locking the turntable in a fixed position, means for inserting the card onto the turntable in this position, means for realigning the turntable in this position after rotation thereof and means for ejecting the card from the turntable.

Although the present invention has been described with reference to preferred embodiments, workers skilled in the art will recognize that changes may be made in form and detail without departing from the spirit and scope of the invention. In this regard, the centering of the annular data storage region on the face of a data card is not necessary, because the axis of the rotation of the card need not be at the center of the card. Any small imbalances created by spinning the card off center are easily compensated for by counterbalancing the turntable. The annular data storage region can thus be located anywhere on the face of the card, providing unlimited artistic latitude in card design. In addition, an alternative to referencing the card for scanning by use of the side and end edges of the card is the provision of a cone-shaped pin on the turntable which would engage a dimple on a back face of the card, with the dimple aligned on the axis of the annular data storage region of the card and the axis of rotation of the turntable. Further, it is contemplated that the annular data storage region of the card may include more than one data storage medium. For instance, a portion of the storage region may include magnetic media while another portion of the storage region may include optical media. In such an arrangement, the data transfer assembly would of course include the components necessary to scan information on each separate media portion of the card simultaneously.

What is claimed is:

1. An apparatus for aligning a data card having a top surface bearing a generally planar annular data storage region thereon for data transfer and having an opposite bottom surface, the apparatus comprising:
    a rotatable card holder having a support for the bottom surface of the card, the card holder aligning the annular data storage region of the card perpendicular to the axis of rotation of the card holder, and aligning the card so that the axis of rotation of the card holder is coaxially aligned with the annular data storage region of the card;
    a drive assembly to rotate the card holder and card thereon about the axis of rotation; and
    a plurality of flyweight members pivotally mounted along opposite sides of the card holder to engage the top surface of the card at locations radially disposed outside the annular data storage region to apply a force from each flyweight member, as a function of the rate of rotation of the card holder, to urge the bottom surface of the card against the support.

2. The apparatus of claim 1 wherein the top surface of the card is a first planar side facing away from the cad holder and wherein each flyweight has a tab portion overlying the first planar side of the card and a greater mass portion spaced therefrom, with the flyweight being pivotally mounted to the card holder at an area between the tab and greater mass portions so that rotation of the card holder causes the greater mass portion to swing outwardly from the card holder to thereby swing the tab portion downwardly against the first planar side of the card.

3. The apparatus of claim 1, and further comprising:
    means for placing the card holder in a predetermined non-rotational position to permit introduction and withdrawal of the data card to and from the support of the card holder.

4. The apparatus of claim 3 wherein the placing means further includes:
    an annular surface fixed relative to the card holder for coupled coaxial rotation therewith, with the surface having an alignment notch therein; and
    an alignment finger receivable in that notch to fix the position of the card holder.

5. The apparatus of claim 4 wherein the placing means includes means for moving the alignment finger between a first position against the annular surface of the card holder for notch engagement and a second position spaced from the annular surface of the card holder.

6. The apparatus of claim 4 wherein the alignment finger is biased toward the annular surface of the card holder.

7. The apparatus of claim 1 wherein the support of the card holder has an end wall, and further comprising:
    a card insertion device for urging a leading end edge of the data card into engagement with the end wall.

8. The apparatus of claim 7 wherein the insertion device is movable between a first active position wherein a portion thereof engages the data card when the card holder is not rotating and a second inactive position wherein said portion is spaced from the card holder to permit rotation thereof.

9. The apparatus of claim 1, and further comprising:
    a card ejection device for urging the card off of the support of the card holder.

10. The apparatus of claim 9 wherein the ejection device is movable between a first active position wherein a portion thereof engages the data card when the card holder is not rotating and a second inactive position wherein said portion thereof is spaced from the card holder to permit rotation thereof.

11. The apparatus of claim 1 wherein the support of the card holder has a side wall and bias means for urging a side edge of the data card into engagement with the side wall.

12. The apparatus of claim and further comprising:
    means for moving the data card along a generally linear path to and from the support.

13. The apparatus of claim 12 wherein the moving means include a roller assembly having opposed parallel rollers with a nip therebetween which defines a portion of the path, with the rollers being driven so that a card entering the nip from a first side thereof is moved along the path toward the card holder.

14. The apparatus of claim 13 wherein the driven rotation of the rollers is reversible so that a card entering the nip from a second opposite side thereof is moved along the path away from the card holder.

15. The apparatus of claim 14 wherein the moving means further includes a card ejection device which engages the data card on the support to urge it off of the support along the path and into the nip of the rollers from the second side thereof.

16. The apparatus of claim 13 wherein the moving means further includes a card insertion device which engages the data card after the rollers to urge it completely onto the support of the card holder.

17. The apparatus of claim 16 wherein the card insertion device has a finger which is movable into the path to contact a trailing end edge of the data card only after that edge clears the nip of the rollers.

18. The apparatus of claim 17 wherein the finger is movable between an active position wherein it engages the data card and an inactive position wherein it is out of the path of the data card.

19. The apparatus of claim 18 wherein the finger pushes the data card into a predetermined position on the support, and wherein the card insertion device further includes bias means for affirmatively urging the finger to align the card in its predetermined position on the support.

20. The apparatus of claim 12 wherein the moving means includes slot means for initially aligning the data card onto the path.

21. A method of positioning a data card having a top surface bearing a generally planar annular data storage region thereon for data transfer and having an opposite bottom surface, the method comprising the steps of:
placing the card on a support with its bottom surface facing the support;
rotating the support and card thereon about an axis which is coaxial with a central axis of the annular data storage region and which is normal to the annular data storage region of the card;
moving a plurality of flyweights into engagement with the top surface of the card at locations radially disposed outside of the annular data storage region and spaced along outer side edges of the card; and
applying a force to the card to urge the card against the support in a direction generally parallel to the central axis of the annular data storage region, with each of the forces being applied by its respective flyweight as a function of the rate of rotation of the card.

22. The method of claim 21 wherein the placing step includes the steps of:
fixing the support in a non-rotatable position; and
inserting the card longitudinally along a linear path onto the fixed support.

23. The method of claim 22 wherein the path is in part defined by a nip between opposed rollers, and wherein the inserting step includes the steps of:
aligning a leading edge of the card between the nip; and
rotating the rollers to engage the card therebetween and move it along the path toward the support.

24. The method of claim 23 wherein the inserting step further includes the steps of:
engaging a trailing edge of the card after it clears the nip with a finger; and
moving the finger toward the support.

25. The method of claim 22 wherein the placing step further includes the step of:
releasing the support from its non-rotatable position after the card has been inserted onto the support.

26. The method of claim 22 wherein the inserting step includes urging a leading edge of the card into abutting engagement with an end wall on the support.

27. The method of claim 22 wherein the inserting step includes urging a side edge of the card into abutting engagement with a side wall on the support.

28. An apparatus for aligning a data card having a top surface bearing a generally planar annular data storage region thereon for data transfer and having an opposite bottom surface, the apparatus comprising:
a rotatable card holder having a support for the bottom surface of the card, the card holder aligning the annular data storage region of the card perpendicular to the axis of rotation of the card holder, and aligning the card so that the axis of rotation of the card holder is coaxially aligned with the annular data storage region of the card;
a drive assembly to rotate the card holder and card thereon about the axis of rotation;
a plurality of flyweight members overlying the support and top surface of the card thereon which are pivotally mounted with respect to the card holder to apply a force, as a function of the rate of rotation of the card holder, to urge the bottom surface of the card against the support; and
means for inserting the card into the card holder above the support and under the overlying flyweight members.

* * * * *

UNITED STATES PATENT AND TRADEMARK OFFICE
CERTIFICATE OF CORRECTION

PATENT NO. : 5,149,951

DATED : September 22, 1992

INVENTOR(S) : Vogelgesang

It is certified that error appears in the above-identified patent and that said Letters Patent is hereby corrected as shown below:

Col. 4, line 56, change "information, with" to --information. With--.

Col. 14, line 39, change "7" to --70--.

Col. 14, line 41, change "s" to --as--.

Col. 15, line 57, change "long" to --along--.

Col. 15, line 61, change "39" to --396--.

Col. 19, line 45, change "cad" to --card--.

Col. 20, line 32, after "claim", insert --1--.

Signed and Sealed this

Thirtieth Day of November, 1993

Attest:

BRUCE LEHMAN

Attesting Officer

Commissioner of Patents and Trademarks